United States Patent Office 3,100,796
Patented Aug. 13, 1963

3,100,796
METHOD FOR MAKING AR-POLY(HYDROXY-METHYL)DIPHENYL ETHERS
Walter B. Trapp and James D. Doedens, Midland, Mich., assignors to The Dow Chemical Company, Midland, Mich., a corporation of Delaware
No Drawing. Filed Apr. 4, 1960, Ser. No. 19,507
5 Claims. (Cl. 260—488)

This invention concerns ar-poly(hydroxymethyl)diphenyl ethers and their method of preparation. More particularly, it concerns those ar-poly(hydroxymethyl)diphenyl ethers (hereinafter ar-PHMDPE's) having in excess of one and up to 4 hydroxymethyl groups per diphenyl oxide moiety wherein up to 2 hydroxymethyl groups are on one aromatic nucleus. The invention further concerns a method for making such ar-PHMDPE's by reacting corresponding ar-poly($CH_2X$)diphenyl ethers, wherein X is one of acetoxy, bromine and chlorine to hydrolyze the X groups to corresponding alcoholic OH groups and recovering the ar-PHMDPE.

The new, useful and unobvious compounds of this invention have the formula:

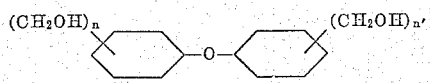

wherein $n$ is a quantity between 0 and 2 and the sum of $n$ and $n'$ is in excess of one and up to 4 and includes 2,4'-dimethyloldiphenyl ether, 4,4'-dimethyloldiphenyl ether, trimethyloldiphenyl ether and tetramethyloldiphenyl ether and mixtures thereof. They are useful in making alkyd and polyester resins following usual procedures in place of polyhydric alcohols conventionally used. The 4,4'-dimethyloldiphenyl ether is a nematocide.

The ar-PHMDPE's of this invention are made by hydrolyzing the X of the $CH_2X$ groups of the corresponding ar-poly($CH_2X$)diphenyl ethers wherein X has the meaning indicated above. The hydrolysis can be carried out in various ways. The novel ar-poly(acetoxymethyl) intermediates, for example, can be hydrolyzed by heating their solution in a lower monohydric alcohol, e.g., methanol, ethanol, propanol, or butanol or a suspension of such an intermediate in water with excess aqueous alkali metal hydroxide over that required by the acetoxymethyl groups to a temperature within the range of about 75°–100° C. for a time sufficient (generally up to about two hours) to hydrolyze off the acetoxy groups and to replace the latter with alcoholic OH groups. A melting point test of the product suffices to determine when this reaction has been completed or substantially completed. The resulting mixture is diluted with water, filtered off, washed by reslurrying with water, and dried, advantageously in a desiccator or even in the open air.

The halomethyl intermediates for the ar-PHMDPE's can be hydrolyzed to the latter by refluxing their solutions in acetone, methylethyl ketone, dioxane or t-butyl alcohol, with excess aqueous alkali metal carbonate or bicarbonate over that required by the halomethyl groups at a temperature between about 60°–65° C. for a time sufficient to hydrolyze the bromine or chlorine and replace it with alcoholic hydroxyl. Hydrolysis time generally requires at least 5 hours and usually not more than 6 hours, and can be determined by an analytic test for halogen on a portion of water washed product. The solvent is then removed and the product is washed free of salt impurities, advantageously by distillatively stripping off the solvent while simultaneously adding water to the reacted mixture at a rate substantially equal to that of the solvent removal. Thereby product ar-PHMDPE is precipitated and is thereafter filtered, washed (advantageously by reslurrying with water and refiltering) and dried.

In the solvent method just described, considerable latitude exists as to the proportions of materials. The alkali metal carbonate or bicarbonate, for example, is advantageously used in amount up to 10 percent excess of stoichiometric requirements for hydrolyzing the halomethyl groups. For 100 parts of 4,4'-di(halomethyl)diphenyl ether, for example, from 40 to 46 weight parts of sodium carbonate or equivalent alkali metal carbonate or bicarbonate is advantageously used together with 160 to 300 parts of water and 700 to 2000 parts of acetone or equivalent solvent, as set forth above.

Another method for making the ar-PHMDPE's of this invention is to form an emulsion of ar-poly(halomethyl)-diphenyl ether in aqueous alkali metal hydroxide solution using an oil-in-water emulsifying agent such as the well-known alkyl sulfonates, alkyl aryl sulfonates, polyether non-ionics, alkyl sulfates and sulfonated alkyl aryl ethers, advantageously sulfonated dodecyldiphenyl ethers, and heating the resulting mixture with agitation at atmospheric pressure or in a closed system at about 80° to 100° C. for a time sufficient to hydrolyze the bromine or chlorine, advantageously for about 5 hours. From about 0.5 to 2 weight percent of emulsifying agent, ar-poly(halomethyl)diphenyl ether basis, and from one weight part of ar-poly(halomethyl)diphenyl ether to 4 to 50 parts water is advantageously used. Product purity increases with increasing water content of the emulsion, the upper limit of which is purely economic. A Volhard halide analysis suffices to determine when hydrolysis is complete or substantially complete. The hydrolysis reaction involves a stoichiometric equivalent of alkali metal hydroxide advantageously present in up to 10 percent excess.

It is not essential that the ar-poly($CH_2X$)diphenyl ethers used as reactants in this invention be pure compounds. On the contrary, commercial mixtures are most attractive by reason of their readier availability and lower cost.

The following examples describe completely specific embodiments of the invention claimed and the best mode contemplated by the inventors for practicing their claimed invention.

Example 1

A quantity of 500 grams (1.875 moles) of 4,4'-dichloromethyl)diphenyl ether, 328 grams (4.0 moles) of sodium acetate and 1200 ml. of acetic acid was combined and heated to reflux with stirring for eight hours. The cooled mixture was filtered to remove sodium chloride and the filtrate was heated to 90° C. under water aspirator vacuum to remove the acetic acid solvent. The residual crude product was purified by dissolving in chlorobenzene and extracting the resulting solution with water. The solution was then stripped of solvent and traces of low boilers by heating to 180° C. at one mm. Hg pressure. The residual diacetate product melted at 45° C.

Analysis.—Calcd. for $C_{18}H_{18}O_5$: C, 68.8; H, 5.76. Found: C, 68.68; H, 5.99.

Example 2 p,p'-Oxydibenzyl alcohol diacetate (100 grams, 0.318 mole), was dissolved in 100 ml. of 95 percent ethanol. This solution was combined with 240 grams of 16.7 percent NaOH in water (1.0 mole) in a one-liter flask and heated to 85° C. with agitation. An exothermic effect occurred between 25° and 55° C. The mixture was a semi-solid between 50° and 75° C. A clear solution existed about 75° C. After 45 min. at 85° C., the mixture was cooled and diluted with 100 ml. water. The solid product was separated by filtration and reslurried and washed with water to give 69.5 grams (95 percent) of p,p'-oxydibenzyl alcohol, M.P. 132°–134.5° C.

Analysis.—Calcd. for $C_{14}H_{14}O_3$: C, 73.1; H, 6.13. Found: C, 72.92; H, 6.23.

Example 3

A quantity of 307 grams of crude 4,4'-oxydibenzyl alcohol diacetate, freezing point 35.6° C., was agitated with aqueous sodium hydroxide solution (125 grams sodium hydroxide in 500 ml. water) and the mixture was maintained at 106° C. for two hours. The resulting product was filtered, reslurried and washed with water and dried to give an 88 percent yield of 4,4'-oxydibenzyl alcohol, M.P. 130°–133° C.

Example 4

A solution of 100 parts by weight of 4,4'-di(chloromethyl)diphenyl ether in 800 parts of acetone was combined with a solution of 42 parts of $Na_2CO_3$ in 200 parts of water and heated at reflux at atmospheric pressure with agitation for six hours. The acetone was then stripped off by distillation while simultaneously adding water to the mixture continuously at a rate equal to the rate of acetone removal. The product 4,4'-oxydibenzyl alcohol precipitated during this operation and was filtered, washed with water, again filtered and finally dried to give a product melting between 128° and 134° C.

Other solvents that can be used in this hydrolysis include methylethyl ketone, dioxane and t-butyl alcohol. Primary and secondary alcohols are unsatisfactory because of a strong tendency toward ether formation.

Alkali metal bicarbonate can be substituted for alkali metal carbonate in the hydrolysis.

Example 5

A quantity of 50 grams of 4,4'-di(chloromethyl)diphenyl ether, M.P. 64°–65° C., was emulsified by stirring into an aqueous solution consisting of 32 grams aqueous 50 percent sodium hydroxide, 1.5 ml. aqueous 30 percent commercial sulfonated dodecyldiphenyl ether and 484 ml. water. The reaction temperature was maintained at 85°–95° C. and at atmospheric pressure for seven hours with stirring. The resulting product was recovered in 98 percent yield by filtering, slurrying and washing with water, filtering again and drying. Its melting point was 128°–130° C.

Example 6

A quantity of 534 grams ar-poly(chloromethyl)diphenyl ether having the following composition:

| | Mole percent |
|---|---|
| 2-mono(chloromethyl)diphenyl ether | 0.25 |
| 4-mono(chloromethyl)diphenyl ether | 2.35 |
| 2,4'-di(chloromethyl)diphenyl ether | 17.7 |
| 4,4'-di(chloromethyl)diphenyl ether | 68.5 |
| Tri(chloromethyl)diphenyl ether | 10.5 |
| Tetra(chloromethyl)diphenyl ether | 0.5 | was added to 540 g. glacial acetic acid
162 g. water
185 g. 97.1 percent pure sodium hydroxide in a glass reactor equipped with a mechanical agitator, thermometer and distillation column. The mixture was heated with stirring and the reaction began at 112°–115° C. Acetic acid and water were distilled off as the reaction commenced and then finally removed completely up to 150° C./2 cm. Hg absolute pressure. After cooling to 100° C., 500 ml. water was added, the mixture was heated to reflux, and aqueous 50 percent sodium hydroxide was added slowly to hydrolyze the acetate groups to methylol groups. Heating was continued an additional hour after all of the sodium hydroxide had been added. The reaction mixture was cooled to 25°–30° C. and filtered. The crystalline product was washed with water until neutral and free of chloride, and then dried. A quantity of 446 g. product was recovered for a 94.6 percent yield. Freezing point of the mixed methylols was 110° C.

The product was a mixture of methyloldiphenyl ethers containing 2-mono(methylol)diphenyl ether, 4-mono(methylol)diphenyl ether, 2,4'-di(methylol)diphenyl ether, 4,4'-di(methylol)diphenyl ether, tri(methylol)diphenyl ether and tetra(methylol)diphenyl ether corresponding substantially to that of the starting mixture of chloromethyldiphenyl ethers.

Example 7

A quantity of 534 grams ar-poly(chloromethyl)diphenyl ether having the following composition:

| | Mole percent |
|---|---|
| 2-mono(chloromethyl)diphenyl ether | 0.5 |
| 4-mono(chloromethyl)diphenyl ether | 4.7 |
| 2,4'-di(chloromethyl)diphenyl ether | 35.4 |
| 4,4'-di(chloromethyl)diphenyl ether | 37.7 |
| Tri(chloromethyl)diphenyl ether | 21.1 |
| Tetra(chloromethyl)diphenyl ether | 0.5–1.0 | was added to 162 g. water
540 g. glacial acetic acid in a 3-liter flask equipped with a stirrer, condenser and fractionating column. Sodium hydroxide (182 g.) was added slowly thereto while the temperature rose from 25° C. to 115° C. Acetic acid and water were distilled off during the reaction (approximately 1¾ hr.). Distillation was stopped when the pot temperature reached 160° C. at 20 mm. Hg pressure. The reaction mixture was cooled to 100° C. and 500 g. water was added. A quantity of 364 g. aqueous 50 percent sodium hydroxide was added slowly to effect saponification. The reaction mixture was heated one hour at 100° C. after complete addition of the caustic. It was then cooled to room temperature and washed with water until neutral. The product at this time was still a liquid. After separation, the organic phase was dried by azeotropic distillation with toluene. The toluene was distilled off to a pot temperature of 100° C. at 20 mm. Hg. The final product was a clear, viscous, light-colored liquid that solidified on cooling. This product had a freezing point of 61°–63° C. and weighed 447 g. for an 86.2 percent yield based on OH present. Analysis of the product showed 11.16 percent OH and 0.056 percent chlorine. The mixture of methyloldiphenyl ethers present had a distribution corresponding substantially to that of the starting mixture of chloromethyldiphenyl ethers.

Example 8

Six ml. of a suspension of rootknot nematodes (Meloidogyne spp.) in aerated distilled water buffered to pH 7.0 with 1/100 molar potassium phosphate were added to 3 dram vials. Three replicates were prepared for each chemical treatment, checks containing acetone and checks not containing acetone. A quantity of one gram of 4,4'-oxydibenzyl alcohol was dissolved in 50 ml. acetone and 2.5 ml. of this solution was dissolved in 200 ml. of distilled water. Four ml. of this final composition was added to the 6 ml. of nematode suspension to give a concentration of 100 p.p.m. of the oxydibenzyl alcohol. Containers were capped. After incubation for six days at 80° F., the percent mortality was 73 percent. For the acetone check, mortality was 10 percent and for the check not containing acetone, about 5 percent.

What is claimed is:

1. ar-Acetoxymethyldiphenyl ethers having from 1 to 4 acetoxymethyl groups per molecule, up to 2 of which are on one benzene nucleus.

2. Method for making ar-poly(hydroxymethyl)diphenyl ethers having up to 4 hydroxymethyl groups per mole by hydrolysis at a temperature between about 75° and 110° C. of ar-poly(acetoxymethyl)diphenyl ethers having up to 4 acetoxy groups per mole, up to 2 of which are on one benzene nucleus with a stoichiometric excess of an alkali metal hydroxide for a time sufficient to displace acetoxymethyl groups and to replace them with hydroxyl groups and separating the ar-poly(hydroxymethyl)diphenyl ether product from the reaction medium.

3. Method of claim 2 wherein the ar-poly(acetoxymethyl)diphenyl ether is in solution in a lower monohydric alcohol having from 1 to 4 carbon atoms.

4. Method of claim 2 wherein the ar-poly(acetoxymethyl)diphenyl ether is suspended in water.

5. Method of making ar-poly(hydroxymethyl)diphenyl ethers having up to 4 hydroxymethyl groups per mole by hydrolysis at a temperature between about 60° and 100° C. of ar-poly(halomethyl)diphenyl ethers having up to 4 halomethyl groups per mole, halo being one of chloro and bromo, up to 2 of which halomethyl groups are on one benzene nucleus with a stoichiometric excess of a member of the group of alkali metal carbonates and alkali metal bicarbonates, wherein said ar-poly(halomethyl)diphenyl ether is in solution in a member of the group consisting of acetone, methylethyl ketone, dioxane and t-butyl ether, for a time sufficient to displace chloromethyl groups and replace them with hydroxyl groups and recovering ar-poly(hydroxymethyl)diphenyl ether product.

References Cited in the file of this patent
UNITED STATES PATENTS

| | | |
|---|---|---|
| 2,130,527 | Coleman | Sept. 20, 1938 |
| 2,639,298 | Head | May 19, 1953 |
| 2,822,378 | Bader | Feb. 4, 1958 |
| 2,911,380 | Doedens | Nov. 3, 1959 |
| 2,963,379 | Kaupp et al. | Dec. 6, 1960 |

OTHER REFERENCES

Karrer: "Organic Chemistry," 4th Edition, Elsevier Pub. Co., Inc., New York, 1950, page 82.

Wagner et al.: "Synthetic Organic Chemistry," Wiley and Sons, Inc., New York, 1953, pages 169 to 171.

Fieser et al.: "Organic Chemistry," 3rd Edition, Reinhold Pub. Corp., New York, 1956, page 178.